(12) United States Patent
Schmidt

(10) Patent No.: US 6,935,481 B2
(45) Date of Patent: Aug. 30, 2005

(54) SNAP-IN BALANCE PISTON

(75) Inventor: Thomas Schmidt, Landau (DE)

(73) Assignee: BorgWarner Inc., Auburn Hills, MI (US)

( * ) Notice: Subject to any disclaimer, the term of this patent is extended or adjusted under 35 U.S.C. 154(b) by 0 days.

(21) Appl. No.: 10/428,545

(22) Filed: May 2, 2003

(65) Prior Publication Data

US 2005/0072647 A1 Apr. 7, 2005

(30) Foreign Application Priority Data

May 10, 2002 (DE) .......................................... 02010541

(51) Int. Cl.⁷ ........................................ F16D 25/0638
(52) U.S. Cl. ............................. 192/106 F; 192/85 AA
(58) Field of Search ............................. 192/85 AA, 86, 192/106 F; 92/30; 403/326

(56) References Cited

U.S. PATENT DOCUMENTS

| 4,813,808 | A | * | 3/1989 | Gehrke ........................ 403/326 |
| 4,898,493 | A | * | 2/1990 | Blankenburg ............... 403/326 |
| 5,172,799 | A | * | 12/1992 | Iijima et al. ............. 192/106 F |
| 5,267,807 | A | | 12/1993 | Biedermann et al. | |

FOREIGN PATENT DOCUMENTS

EP    1 079 130 A2    2/2001
JP    4-191530 A      7/1992
JP    05321947 A    * 12/1993    ........... F16D/25/14

OTHER PUBLICATIONS

European Search Report for Application No. 02010541.7-2423-corresponding to this U.S. application.

* cited by examiner

*Primary Examiner*—Richard M. Lorence
(74) *Attorney, Agent, or Firm*—Emch, Schaffer, Schaub & Porcello, Co., L.P.A.; Greg Dziegielewski

(57) ABSTRACT

The invention relates to a clutch device with a pressure piston (1) for generating a pressure force for moving a clutch (4, 9, 8, 10, 27), in which the pressure piston (1) is guided to slide in a housing (5, 15.1) and the housing (5, 15.1) and the pressure piston (1) enclose a pressure chamber (11), which can be pressurized with a pressurizing agent (24) to generate the aforementioned pressure force and in which a balance piston (2) is present to generate a counterpressure force on the pressure piston (1), which is held essentially immobile to the housing (5, 15) when the clutch (4, 9, 8, 10, 27) is put into motion in the sliding direction of the pressure piston (1) and which, together with the housing (5, 15.1) and the pressure piston (1), encloses a balance chamber (12), which can be pressurized with a counterpressurizing agent to generate a counterpressure force. A latching mechanism (28.1, 29.1, 30.1, 31.1) is provided according to invention hold the balance piston (2) immobile as described above.

13 Claims, 6 Drawing Sheets

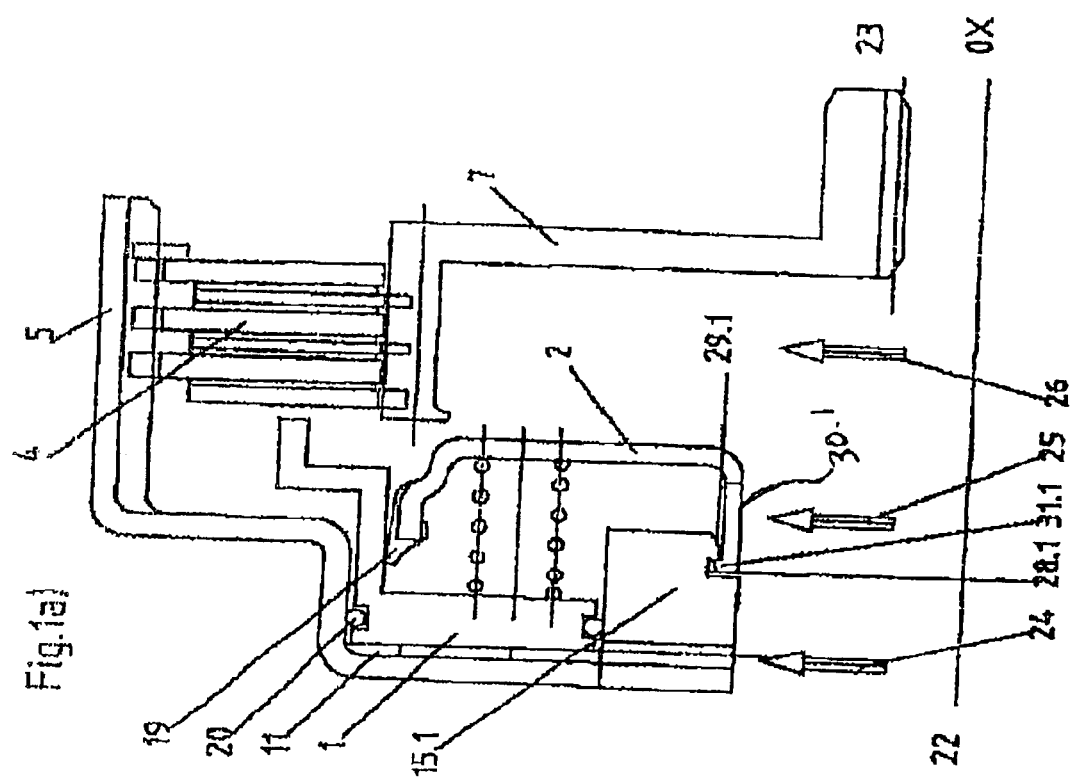

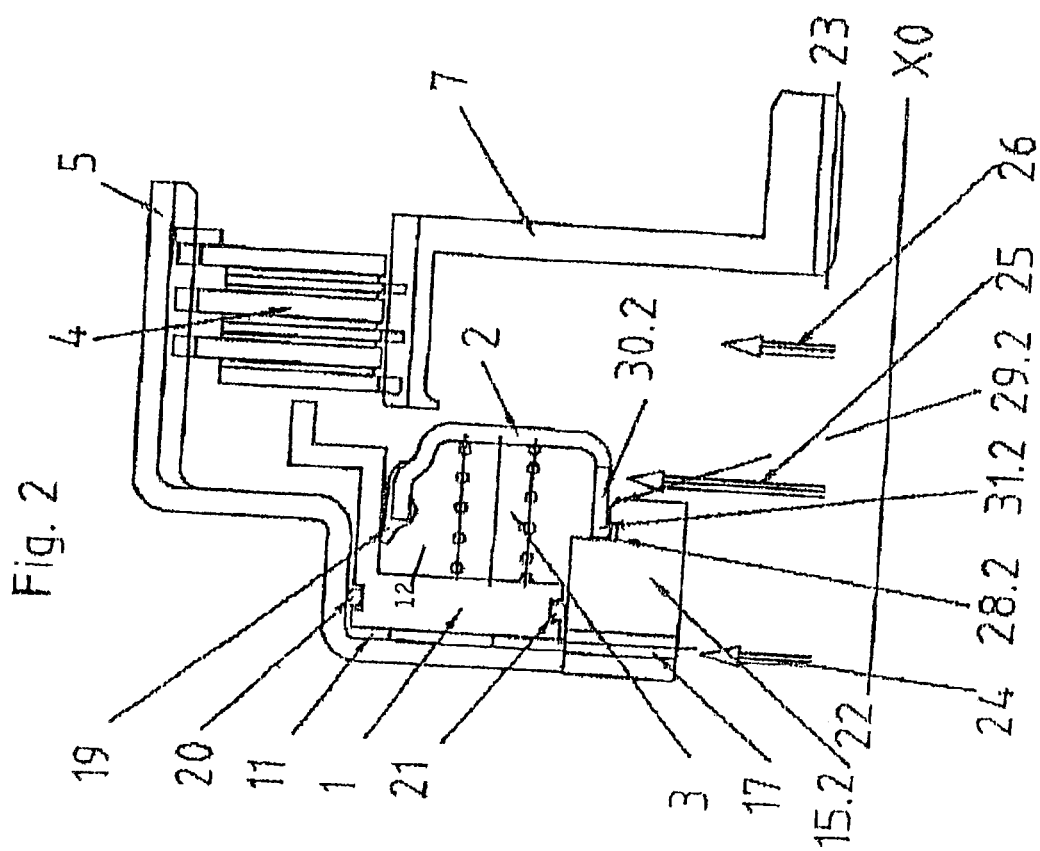

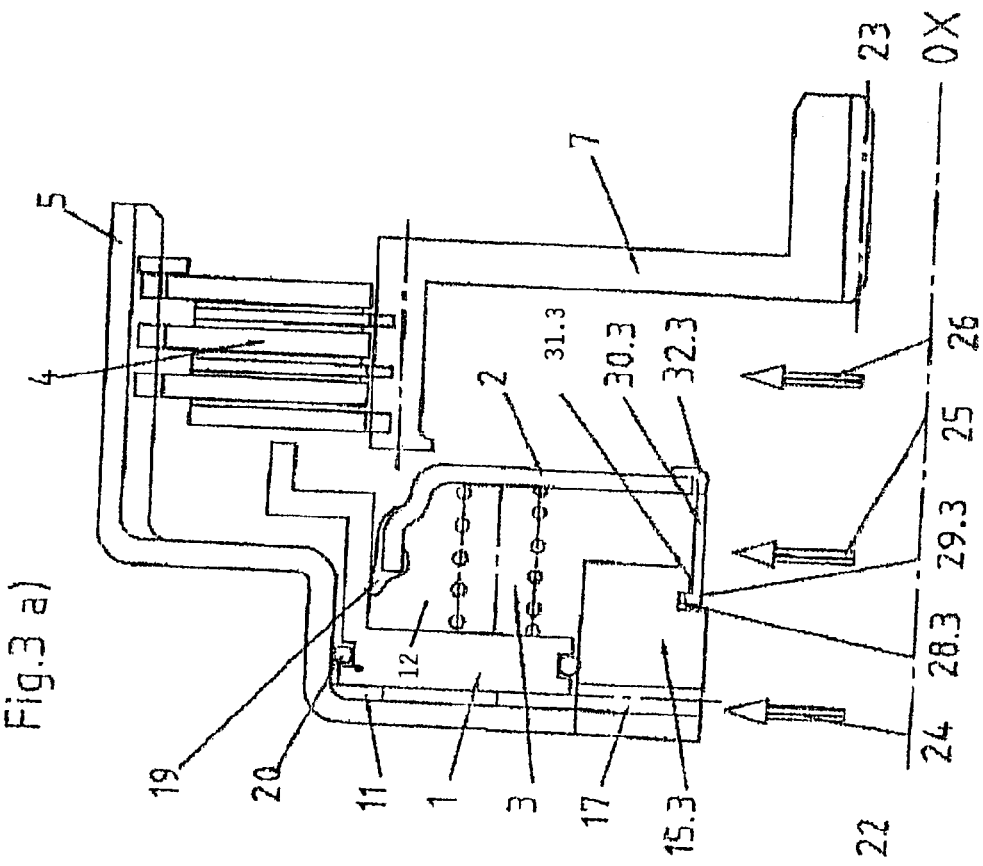

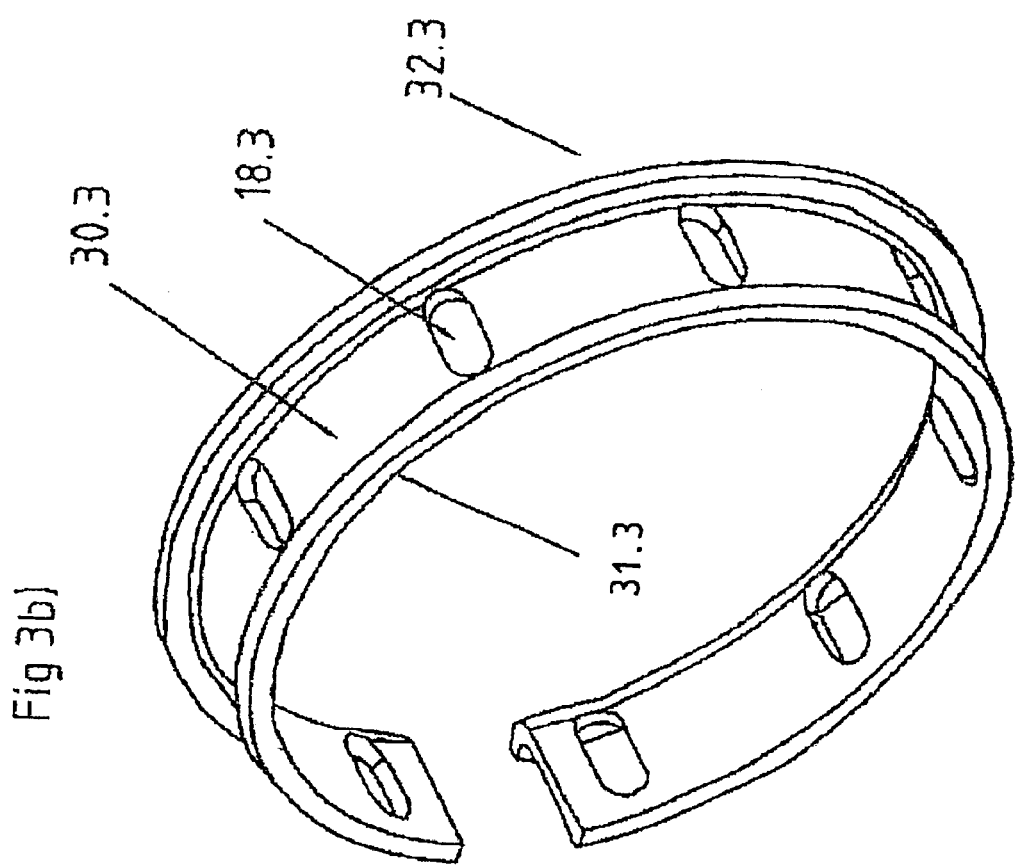

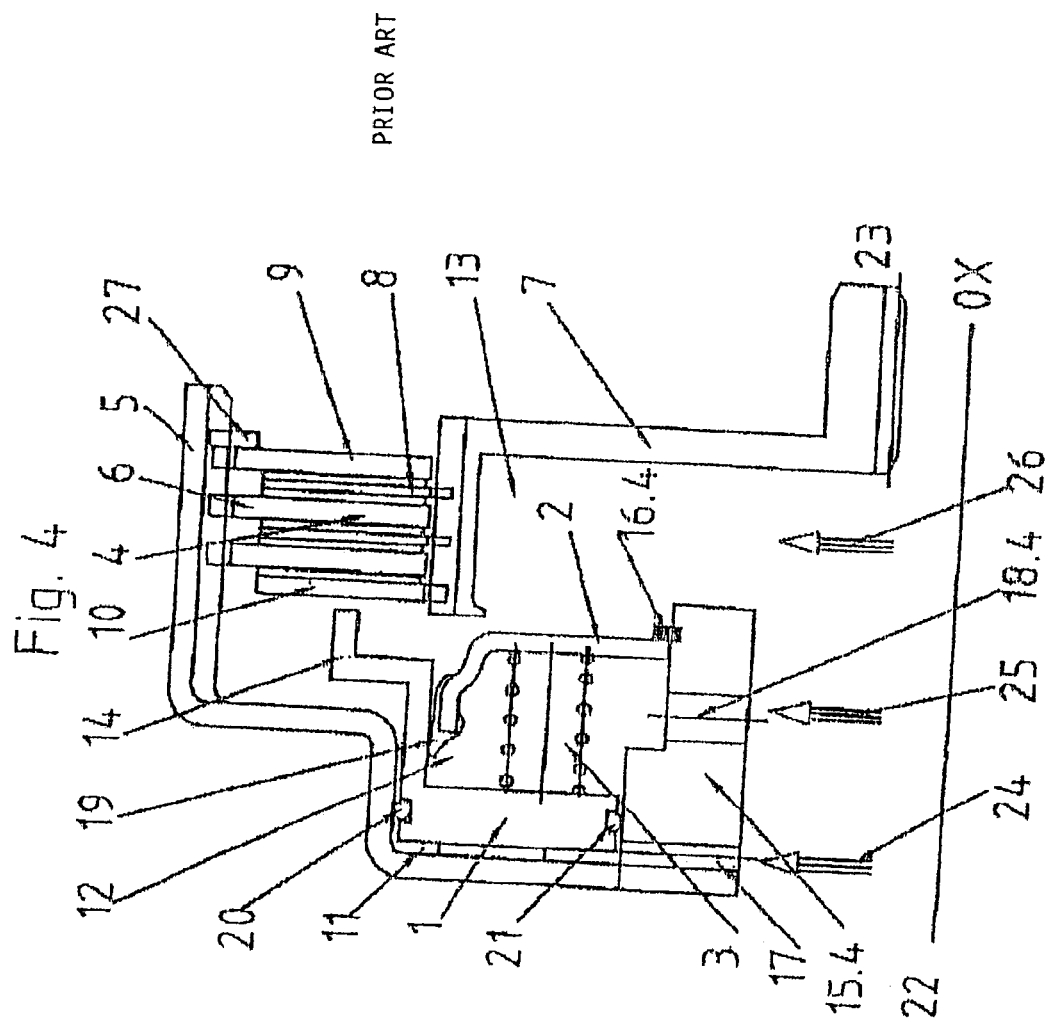

SNAP-IN BALANCE PISTON

BACKGROUND OF THE INVENTION

The invention relates to a clutch device for a motor vehicle.

The well-known clutch devices, from which the invention proceeds, are known in many variations in the state of the art. In addition to the actual clutch, other elements are connected to a combustion engine by a drive shaft on the drive end and are connected to a transmission by an output shaft on the output-end. For example, the drive shaft is connected to the output shaft when the clutch is put into motion. Such clutch devices include an operating device for moving this clutch.

The invention relates to clutch devices in which the operating device comprises a pressure piston. This pressure piston is arranged in a housing in accordance with the state of the art. This pressure piston is furthermore movably guided within this housing. An appropriate sliding movement by the pressure piston can move the clutch.

In order for the pressure piston to generate such a sliding movement, it is necessary to generate a corresponding pressure force. This is normally done hydraulically. To be specific, the housing and pressure piston according to the state of the art are arranged together in such a manner that they enclose a hollow space, hereinafter called a pressure chamber, which can be pressurized with a suitable pressurizing agent, usually a synthetic oil designed for this purpose, in order to generate the aforementioned pressure force.

After a clutch has been put into motion, it is necessary to return the pressure piston back to its starting position. It is desirable to selectively meter the pressure force that causes the sliding movement of the piston. Control of the pressure force is consequently necessary if the housing and pressure piston represent parts that rotate with the drive shaft. In this case, the pressure of the pressurizing agent within the aforementioned pressure chamber will rise with the speed of the rotary motion, a result which is generally undesirable.

To be able to return the pressure piston back to its starting position and additionally be able to control the pressure force that causes the sliding movement of the piston, the operating device in accordance with the state of the art comprises a mechanism for generating a counterpressure force that operates against the aforementioned pressure force. A mechanism of this type for generating the counterpressure comprises another piston, which will hereinafter be called a balance piston. This balance piston is so arranged that it, together with the pressure piston and housing, encloses a hollow space, which will hereinafter be called a balance chamber. Like the aforementioned pressure chamber, this balance chamber can be pressurized with a (counter) pressurizing agent, preferably a synthetic oil, to generate the counterpressure.

To generate the counterpressure operating on the pressure piston, it is necessary to hold the balance piston immobile relative to the housing when the balance chamber is pressurized with the (counter) pressurizing agent. Mechanisms for this purpose that are known from the state of the art require additional space within the clutch device and are also relatively expensive to manufacture and/or take more time to assemble, which is likewise reflected in a higher price for the end product.

To explain the facts, which have been depicted very generally above, the problematic nature shall now again be presented by way of example based on a multi-disc clutch device in accordance with the state of the art illustrated in FIG. 4.

The illustrated multi-disc clutch device comprises a housing designed essentially rotationally symmetrical to an axis $0x$ and connected to a drive shaft (unillustrated) on the drive end 22 and consisting of an essentially hollow cylindrical external plate-disc carrier 5 and an essentially hollow cylindrical center section 15.4 coaxial to the essentially hollow cylindrical external plate-disc carrier 5 and located therein. A constituent part of the multi-disc clutch device is furthermore an internal plate-disc carrier 7 on the output end 23 connected to an output shaft (not illustrated) and designed essentially rotationally symmetrical to the axis $0x$.

As can be deduced from the drawing, external and internal plate-disc carriers 5, 7 are carriers of so-called external and internal plate-discs 6, 8. These are mounted on their respective external and internal plate-disc carriers 5, 7 basically tight yet with a limited axial movement. The entire fitting arrangement, in the present case consisting of three external and three internal plate-discs 5, 7 is called a disc pack 4. External and internal plate-discs 5, 7 mesh together comblike and can be brought together into frictional connection in pairs. The disc-plate that terminates the disc pack 4 on one end and whose axial movement is restricted on one end by means of a locking ring 27 (here an external plate-disc) is called an end plate. In FIG. 4, this has been assigned the reference character 9. The disc-plate that terminates the other end of disc pack 4 (presently an internal plate-disc) is called a pressure plate. In FIG. 4, this pressure plate has been assigned reference character 10.

This fitting arrangement of a disc pack 4 consisting of several plate-discs (six in the present case) on external and internal plate-disc carriers 5, 7, preferably being cooled for example by a coolant like cooling oil 26 supplied via a cooling oil chamber 13, forms the portion of a multi-disc clutch device called "actual clutch".

Another constituent part of the multi-disc clutch device in accordance with the state of the art and depicted in FIG. 4 is the previously mentioned operating device for moving this clutch. As likewise explained in detail above, this operating device comprises of the pressure piston 1 and the balance piston 2.

Pressure piston 1 is designed essentially circular. The piston's inside wall is guided to slide on the outside wall of the center section 15.4, which is basically shaped like a cylinder jacket. By an appropriate sliding movement, pressure piston 1 presses against the pressure plate 10 of disc pack 4 by means of an appropriate pressure element 14, which is designed circular in the present case, so that the disc pack 4 is pressed together, end plate 9 having no means of axial evasion, and the separate neighboring disc-plates 6, 8 form a frictional connection, thus moving the clutch.

The housing and pressure piston 1 fit together forming a hollow space. This hollow space, the so-called pressure chamber, which is presently sealed against its surroundings by two sealing rings 20, 21, is labeled with the reference character 11 in the Figure.

Pressure oil 24 can be added to this pressure chamber 11 through one or more holes in center section 15.4 that run radially. The corresponding holes are consequently called pressure oil channels. One of these pressure oil channels can be found in FIG. 4, where it is labeled with reference character 17.

In the exemplary embodiment depicted in FIG. 4, balance piston 2, named above as a constituent part of the operating device, is designed essentially circular. It is so arranged that it, in combination with the pressure piston 1 and center section 15.4 of the housing, encloses a hollow space. This hollow space is called a balance chamber and is assigned reference character 12 in FIG. 4.

Like pressure chamber 11 described above, balance chamber 12 can be pressurized with a (counter) pressurizing agent, hereinafter called compensating oil 25, which is added through appropriate holes in order to generate the aforementioned counterpressure force. The holes for adding compensating oil 25 will hereinafter be called compensating oil channels. FIG. 4 depicts one of these compensating oil channels radially penetrating through the center section 15.4 of the housing. It is labeled with reference character 18.4.

In the presented exemplary embodiment in accordance with the state of the art, a spring assembly 3, which is supported by an inside wall of the balance piston 2 and held in opposition to the sliding direction of pressure piston 1 when the clutch is put into motion against pressure piston 1, is arranged in balance chamber 12 to further increase the counterpressure force to be generated.

For the sliding of piston 1 in an axial direction to be able to generate an appropriate counterpressure in balance chamber 12 at all when the clutch is put into motion, it is necessary both to seal the balance chamber 12 against its surroundings and also to hold balance piston 2 at least axially immobile. The first of these functions is accomplished with a circular sealing lip 19 that seals the adjacent walls of pressure piston 1 and balance piston 2. The axial slide protection is usually accomplished with a locking ring 16.4 in accordance with the state of the art.

Although this fitting arrangement has been proven in principle, there still exists the need to present an inexpensive and space-saving alternative solution.

It is consequently the objective of the invention to elaborate and develop the known clutch devices in such a manner that they will cost less to manufacture and also feature smaller dimensions.

This task is solved according to invention by a generic clutch device with the characteristics of the characterizing portion of claim 1.

Advantageous embodiments and further developments of the invention are given in the dependent claims.

The essential idea of the invention consists of providing a latching or catching mechanism to basically hold the balance piston immobile to the housing when the clutch is put into motion. It is rapid and easy to assemble a balance piston using this type of latching or catching mechanism. In addition, latching or catching mechanisms are known from many other applications, ensuring inexpensive manufacture and space-saving design.

An advantageous variant of the invention consists of the latching or catching mechanism, hereinafter only called latching mechanism for the sake of simplicity, comprising at least one latching element of a first kind, which is assigned to the housing, and at least one latching element of a second kind, which is assigned to the balance piston, the latching elements of the first and second kind being brought into latching or catching engagement with each other. This variant represents the simplest form of a latch or catch lock and is therefore to be preferred over complicated twist-catch or screw-catch mechanisms, which are of course also conceivable.

In a special embodiment of this variant, the invention provides for the latching element of the second kind to be a constituent part of the balance piston. In some cases it is also advantageous, however, for the latching element of the second kind to be a constituent part of a separate balance-piston holding device, possibly specially provided for this. Both variants can also be applied in combination, if necessary.

A solution to the presented task is provided in any case.

For the cases in which the housing is designed essentially rotationally symmetrical to an axis and comprises of a center section, essentially shaped like a cylinder jacket, whose outside wall guides the inside wall of the pressure piston, which is designed essentially circular, so that the pressure piston slides axially, and on which center section the balance piston is held immobile when the clutch is put into motion in the axial sliding direction of the pressure piston, the balance piston likewise being designed circular, such cases including particularly such a multi-disc clutch device in accordance with the state of the art as illustrated in FIG. 4, it is provided according to invention that the latching element of the first kind is a groove essentially revolving coaxially in the inside wall or outside wall of the center section, and the latching element of the second kind comprises of at least one latching clip or detent that can engage the revolving groove for locking.

The at least one latching clip or detent is preferably formed on the end of a finger essentially axially separated from the balance piston or from the balance-piston holding device. A large number of these latching clips attached on the end of a finger are usually attached coaxial to a circular end of the balance piston or balance-piston holding device. Alternatively, it is also provided according to invention that a single latching clip is designed revolving coaxially.

In another embodiment of the invention it is moreover provided that the balance-piston holding device, which is preferably circular, is designed to fit a balance piston similar to that of FIG. 4.

Three exemplary embodiments of the invention are illustrated in the drawings and compared to one variant of a multi-disc clutch device according to the state of the art.

BRIEF DESCRIPTION OF THE DRAWINGS

FIG. 1a is a first exemplary embodiment of a multi-disc clutch device according to invention with a balance piston according to invention in axial semi-section.

FIG. 2 is a second exemplary embodiment of a multi-disc clutch device according to invention with balance piston according to invention in an axial semi-section.

FIG. 3a is a third exemplary embodiment of a multi-disc clutch device according to invention with retaining ring according to invention for the balance piston in axial semi-section.

FIG. 3b is the retaining ring according to invention as shown in FIG. 3a in perspective illustration.

FIG. 4 is an exemplary embodiment of a multi-disc clutch device according to the state of the art in axial semi-section.

Figure 1B:
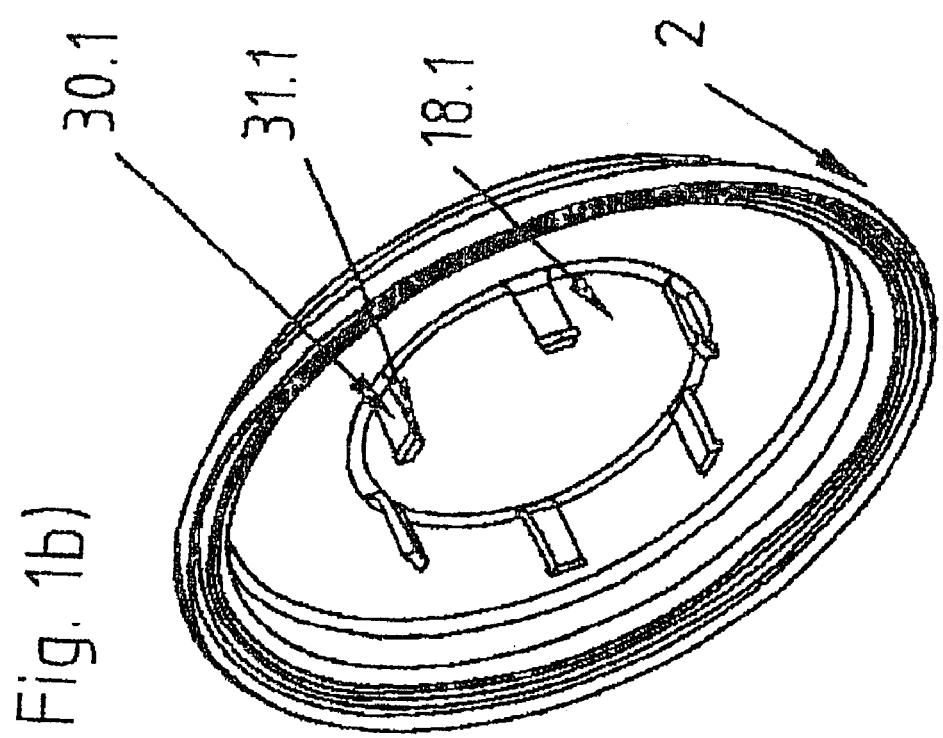
FIG. 1b is the balance piston according to invention as shown in FIG. 1a) in a perspective illustration.

The exemplary embodiments of the invention will be explained in more detail in the following.

DETAILED DESCRIPTION OF THE PREFERRED EMBODIMENTS

All exemplary embodiments proceed from a multi-disc clutch device of known art, as described in detail above and illustrated in FIG. 4. For all exemplary embodiments of multi-disc clutch devices described below, all individual components will accordingly be explained identically. To make it easy to assign identical components, they have been provided with the same reference characters in all the figures.

All multi-disc clutch devices referred to below comprise of a housing designed essentially rotationally symmetrical to an axis $0x$ and connected to a drive shaft (unillustrated) on the drive end 22 and consisting of an essentially hollow cylindrical external plate-disc carrier 5 and an essentially hollow cylindrical center section coaxial to the essentially hollow cylindrical external plate-disc carrier 5 and located therein, the center section being assigned different reference characters 15.1 through 15.3 in the respective figures of the different exemplary embodiments according to invention based on its development according to invention.

Moreover, all multi-disc clutch devices shown in FIGS. 1 to 3 corresponding to the multi-disc clutch device according to the state of the art illustrated in FIG. 4 comprise of an internal plate-disc carrier 7 designed essentially rotationally symmetric to the aforementioned axis $0x$ and connected to a drive shaft (unillustrated) on the drive end 23.

Moreover, three external and three internal disc-plates 6, 8 forming a disc pack 4 are provided, which disc-plates 6, 8 are mounted essentially tight but with limited axial movement on the external and internal disc-plate carriers 5, 7, respectively.

The external disc-plate that terminates the disc pack 4 on one end and whose axial movement is restricted on one end by means of a locking ring 27, the so-called end plate, has been assigned the reference character 9 in FIGS. 1, 2, and 3 in correspondence with FIG. 4. The internal disc-plate that terminates the other end of disc pack 4, the so-called pressure plate, has been assigned the reference character 10 in FIGS. 1, 2 and 3 in correspondence with FIG. 4.

Other constituent parts of multi-disc clutch devices are the pressure piston 1 and balance piston 2. A circularly designed pressure element 14 for moving the clutch has furthermore been assigned to pressure piston 1 in all exemplary embodiments in accordance with the invention (FIGS. 1 to 3).

The inside wall of pressure piston 1 is guided to slide on the outside wall of the center section 15.1 (shown in FIG. 1a), 15.2 (shown in FIG. 2), 15.3 (shown in FIG. 3a), which is essentially shaped like a cylinder jacket. The housing and pressure piston 1 are arranged together to form the so-called pressure chamber 11. This pressure chamber 11 is sealed against its surroundings by two sealing rings 20, 21. From FIGS. 1 to 3, it is furthermore possible to derive a pressure oil channel within the center section 15.1, 15.2, 15.3.

In all embodiments in accordance with FIGS. 1 to 3, the balance piston 2 is designed essentially circular and so arranged that it encloses the so-called balance chamber 12 in combination with the respective pressure piston 1 and respective center section 15.1, 15.2, 15.3 of the housing.

A sealing lip 19 for sealing the balance chamber 12 against its surroundings is provided between the circular walls of pressure piston 1 and balance piston 2 that are adjacent to each other.

A spring assembly 3, which is supported by an inside wall of the balance piston 2 and held in opposition to the sliding direction of pressure piston 1 when the clutch is put into motion against pressure piston 1, is arranged within the corresponding balance chambers 12 in all variants in accordance with the invention in correspondence with the exemplary embodiment corresponding to the state of the art.

FIGS. 1a and 1b show a first exemplary embodiment for a clutch device for a motor vehicle with a latching mechanism provided according to invention. In the example under discussion, the latching mechanism is realized by providing the essentially ring-shaped balance piston 2 with separate (here: six) fingers 30.1, which are arranged equidistant to each other on its inside perimeter and essentially pointing in the axial direction, each of which on its open end demonstrates a latching clip or detent 31.1 in the manner of a barb pointing radially outwards. In correspondence to this, the center section 15.1 demonstrates a coaxially revolving groove 28.1 turned in the inside cylinder-jacket-shaped wall, forming a coaxially revolving latching clip or detent 29.1 pointing radially inwards, which groove the latching clip 31.1 of the balance piston 2 arranged on the ends of the fingers 30.1 can engage to lock the balance piston 2 with the housing. Let it be noted that the clearances between the separate fingers 30.1 also serve as compensating oil channels 18.1 for the compensating oil 25.

FIG. 2 show a second exemplary embodiment of a clutch device for a motor vehicle with a latching mechanism provided according to invention. Here the latching mechanism is realized by providing the balance piston 2, which is essentially ring-shaped, with separate fingers 30.2, which are arranged on its inside perimeter and essentially point in the axial direction and whose open ends each demonstrate a latching clip or detent 31.2 in the manner of a barb pointing radially outwards. In correspondence to this, the center section 15.2 demonstrates a coaxially revolving groove 28.2 turned in the external cylinder-jacket-shaped wall, forming a coaxially revolving latching clip or detent 29.2 point radially outwards. Here too the clearances between the separate fingers 30.2 serve as compensating oil channels 18.2 for the compensating oil 25.

FIGS. 3a and 3b show a third exemplary embodiment of a clutch device for a motor vehicle with a latching mechanism provided according to invention. In the example under discussion here, the latching mechanism is realized by providing a special cylindrical retaining ring 32.3 for the balance piston 2, which is essentially ring-shaped. One end of this retaining ring 32.3 surrounds the inside circumference of balance piston 2. Like the balance piston 2 described above, the other side of the this retaining ring 32.3 demonstrates fingers 30.3, which run essentially in the axial direction and whose ends here flow into a latching clip or detent 31.3 corresponding to the first exemplary embodiment depicted in FIGS. 1a and 1b. Unlike the previous examples, the latching clip or detent 31.3, which points outwards, is designed revolving, so that it forms a closed ring at the ends of the fingers 30.3. It is obvious to a person skilled in the art, that the latching mechanism of this type of retaining ring 32.3 can also be designed to correspond to the latching mechanisms of the aforementioned balance piston 2 and vice versa.

For completeness let it be mentioned that in correspondence to this, the center section 15.3 demonstrates a coaxially revolving groove 28.3 turned in the inside cylinder-jacket-shaped wall, forming a coaxially revolving latching clip or detent 29.3 pointing radially inwards, which groove 28.3 the latching clip or detent 31.3 of the retaining ring 32.2 can engage to lock the balance piston 2 with the housing, the latching clip or detent 31.3 being arranged on the ends of the fingers 30.3.

The above detailed description of the present invention is given for explanatory purposes. It will be apparent to those skilled in the art that numerous changes and modifications can be made without departing from the scope of the invention. Accordingly, the whole of the foregoing description is to be construed in an illustrative and not a limitative sense, the scope of the invention being defined solely by the appended claims.

I claim:

1. Clutch device comprising:
   a pressure piston (1) axially moving to engage a clutch (4, 9, 8, 10, 27), said pressure piston (1) being guided to slide in a housing (5, 15.1, 15.2, 15.3, 15.4), said housing (5, 15.1, 15.2, 15.3, 15.4) and said pressure piston (1) enclosing a pressure chamber (11), which can be pressurized with a pressurizing agent (24) to generate the pressure force,
   balance piston (2) for generating a counterpressure on said pressure piston (1), said balance piston is essentially ring-shaped with fingers (30.2) which are having ends each including a detent (31.2) pointing radially outwardly, said balance piston (2) being hold essentially immobile to said housing (5, 15.1, 15.2, 15.3, 15.4) when said clutch (4, 9, 8, 10, 27) is put into motion in the sliding direction of said pressure piston (1), said housing (5, 15.1, 15.2, 15.3, 15.4), said pressure piston (1) and said balance piston (2) enclosing a balance chamber (12) that can be pressurized with a counterpressurizing agent to generate the counterpressure force, and
   a latching mechanism (28.1, 28.2, 28.3, 29.1, 29.2, 29.3, 30.1, 30.2, 30.3, 31.1, 31.2, 31.3) to hold said balance piston (2) immobile to said housing (5, 15.1, 15.2, 15.3, 15.4) when said clutch (4, 9, 8, 10, 27) is put into motion in the sliding direction of said pressure piston (1).

2. Clutch device according to claim 1, characterized in that said latching mechanism comprises of at least one latching element of a first kind (28.1, 28.2, 28.3, 29.1, 29.2, 29.3), which is assigned to said housing (5, 15.1, 15.2, 15.3), and at least one latching element of a second kind (31.1, 31.2, 31.3) which is assigned to said balance piston (2), the latching elements of the first and second kind (28.1, 28.2, 28.3, 29.1, 29.2, 29.3, 31.1, 31.2, 31.3) being brought into latching engagement with each other.

3. Clutch device according to claim 2, characterized in that said latching element of the second kind (31.1, 31.2) is a constituent part of said balance piston (2).

4. Clutch device according to claim 2, characterized in that said latching element of the second kind (31.3) is a constituent part of a balance-piston holding device (32.3).

5. Clutch device according to claim 2, in which said housing (5, 15.1, 15.2, 15.3) is designed essentially rotationally symmetrical to an axis (0x) and comprises a center section (15.1, 15.2, 153), substantially shaped like a cylinder jacket, whose outside wall guides the inside wall of said pressure piston (1), which is designed substantially circular, so that said pressure piston (1) slides axially, and on which center section (15.1, 15.2, 15.3) said balance piston (2), which is designed substantially circular, is held immobile when said clutch (4, 9, 8, 10, 27) is put into motion in the axial sliding direction of said pressure piston (1) characterized in that said latching element of the first kind is a groove (28.1, 28.2, 28.3) circumferentially extending in the inside wall or outside wall of said center section (15.1, 15.2, 15.3) and said latching element of the second kind comprises of at least one latching clip (29.1, 29.2, 29.3) that can engage the groove (28.1, 28.2, 28.3) for locking.

6. Clutch device according to claim 5, characterized in that at least one said latching clip (31.1, 31.2, 31.3) is formed on the end of a finger (30.1, 30.2, 30.3) essentially axially extending from said balance piston (2) or from a balance-piston holding device (32.3).

7. Clutch device according to claim 6 characterized in that said latching clip (31.3) has a generally circular shape which substantially extends coaxially around the inner periphery of the housing (15.3).

8. Clutch device according to claim 4, wherein said balance-piston holding device (32.3) is substantially circular.

9. Clutch device comprising:
   a pressure piston (1) axially moving to engage a clutch (4, 9, 8, 10, 27), said pressure piston (1) being guided to slide in a housing (5, 15.1, 15.2, 15.3, 15.4), said housing (5, 15.1, 15.2, 15.3, 15.4), and said pressure piston (1) enclosing a pressure chamber (11), which can be pressurized with a pressurizing agent (24) to generate the pressure force,
   balance piston (2) for generating a counterpressure on said pressure piston (1) balance piston holding device (32.3) including fingers (30.3) which run essentially in the axial direction and having ends each including a detent (31.3) pointing radially outwardly and forming a closed ring at said ends, said balance piston (2) being held essentially immobile to said housing (5, 15.1, 15.2, 15.3, 15.4) when said clutch (4, 9, 8, 10, 27) is put into motion in the sliding direction of said pressure piston (1), said housing (5, 15.1, 15.2, 15.3, 15.4), said pressure piston (1) and said balance piston (2) enclosing a balance chamber (12) that can be pressurized with a counterpressurizing agent to generate the counterpressure force, and
   a latching mechanism (28.1, 28.2, 28.3, 29.1, 29.2, 29.3, 30.1, 30.2, 30.3, 31.1, 31.2, 31.3)to hold said balance piston (2) immobile to said housing (5, 15.1, 15.2, 15.3, 15.4) when said clutch (4, 9, 8, 10, 27) is put into motion in the sliding direction of said pressure piston (1).

10. Clutch device comprising
    a pressure piston (1) axially moving to engage a clutch (4, 9, 8, 10, 27), said pressure piston (1) being guided to slide in a housing (5, 15.1, 15.2, 15.3, 15.4), said housing (5, 15.1, 15.2, 15.3, 15.4) and said pressure piston (1) enclosing a pressure chamber (11), which can be pressurized with a pressurizing agent (24) to generate the pressure force,
    a balance piston (2) for generating a counterpressure on said pressure piston (1), said balance piston (2) being held essentially immobile to said housing (5, 15.1, 15.2, 15.3, 15.4) when said clutch (4, 9, 8, 10, 27) is put into motion in the sliding direction of said pressure piston (1), said housing (5, 15.1, 15.2, 15.3, 15.4), said pressure piston (1) and said balance piston (2) enclosing a balance chamber (12) that can be pressurized with a counterpressurizing agent to generate the counterpressure force, and
    a latching mechanism (28.1, 28.2, 28.3, 29.1, 29.2, 29.3, 30.1, 30.2, 30.3, 31.1, 31.2, 31.3) to hold said balance piston (2) immobile to said housing (5, 15.1, 15.2, 15.3, 15.4) when said clutch (4, 9, 8, 10, 27) is put into motion in the sliding direction of said pressure piston (1), wherein the latching mechanism includes a first kind of latching element (29.1, 29.2, 29.3) integrally formed with the housing (15.1, 15.2, 15.3), and wherein the first kind of latching element (29.1, 29.2, 29.3) lockingly mates with a second kind of latching element (29.1, 29.2, 29.3, 30.1, 30.2, 30.3, 31.1, 31.2, 31.3) on the balance piston (2), wherein the housing (5, 15.1, 15.2, 15.3) is designed essentially rotationally symmetrical to an axis (0x) and comprises a center section (15.1, 15.2, 153), substantially shaped like a cylinder jacket, whose outside wall guides the inside wall of said pressure piston (1), which is designed substantially circular, so that said pressure piston (1) slides axially, and on which center section (15.1, 15.2, 15.3) said balance piston (2), which is designed substantially circular, is held immobile when said clutch (4, 9, 8, 10, 27) is put into motion in the axial sliding direction of said pressure piston (1) characterized in that said latching element of the first kind is a groove (28.1, 28.2, 28.3 circumferentially extending in the inside wall or outside wall of said center section (15.1, 15.2, 15.3) and said latching element of the second kind comprises of at least one latching clip (29.1, 29.2, 29.3) that can engage the groove (28.1, 28.2, 28.3) for locking, and wherein said latching clip (31.3) has a generally circular shape which substantially extends coaxially around the housing (15.3).

11. Clutch device according to claim 10, wherein said latching element of the second kind (31.3) is a constituent part of a balance-piston holding device (32.3).

12. Clutch device according to claim 11, characterized in that at least one said latching clip (31.1, 31.2, 31.3) is formed on the end of a finger (30.1, 30.2, 30.3) essentially axially extending from said balance piston (2) or from said balance-piston holding device (32.3).

13. Clutch device according to claim 12, wherein said balance-piston holding device (32.3) is substantially circular.

* * * * *